US006484175B1

(12) United States Patent
Stewart

(10) Patent No.: US 6,484,175 B1
(45) Date of Patent: Nov. 19, 2002

(54) METHOD AND APPARATUS FOR PROVIDING NETWORK MANAGEMENT DATA

(75) Inventor: Robert L Stewart, Wilton, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/107,805

(22) Filed: Jun. 30, 1998

(51) Int. Cl.[7] .............................................. G06F 17/30
(52) U.S. Cl. ......................................... 707/10; 709/238
(58) Field of Search ..................... 707/9–10, 103–104; 709/217–229, 238–241

(56) References Cited

U.S. PATENT DOCUMENTS

| 5,706,508 A | * | 1/1998 | Chen et al. ................. 707/200 |
| 5,884,325 A | * | 3/1999 | Bauer et al. ................ 707/201 |
| 5,974,416 A | * | 10/1999 | Anand et al. ................. 707/10 |
| 6,076,107 A | * | 6/2000 | Chen et al. .................. 707/220 |

OTHER PUBLICATIONS

Harry Newton, Newton's Telecom Dictionary. Telecom Books and Flatiron Publishing: New York, 1998. p. 466.

* cited by examiner

*Primary Examiner*—Hosain T. Alam
*Assistant Examiner*—Jean Bolte Fleurantin
(74) *Attorney, Agent, or Firm*—Innovation Partners; Charles E. Gotlieb

(57) ABSTRACT

A method and apparatus provides network management data in a manner that can be more efficient than data provided using conventional SNMP. A requested data description is received containing the names of the data requested, and this requested data is provided. Tables are provided by providing a table name, a list of columns, and for each row in the table, the name of the row and the data for the row in the order the column names were provided. Rows may be provided in the order stored, or numerically by row name. All columns of every row of a table may be provided or just columns specified in the requested data description.

21 Claims, 3 Drawing Sheets

METHOD AND APPARATUS FOR PROVIDING NETWORK MANAGEMENT DATA

RELATED APPLICATIONS

The subject matter of this application is related to the subject matter of, application Ser. No. 09/100,492 entitled, "METHOD AND APPARATUS FOR ASSISTING COMMUNICATION OF INFORMATION BETWEEN TWO PROCESSES" filed on Jun. 19, 1998 by Robert L. Stewart, application Ser. No. 09/100,500 entitled, "METHOD AND APPARATUS FOR ASSISTING COMMUNICATION OF INFORMATION BETWEEN TWO PROCESSES" filed on Jun. 19, 1998 by Robert L. Stewart, each having the same assignee as this application and each incorporated herein by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is related to computer software and more specifically to computer software for computer network equipment.

BACKGROUND OF THE INVENTION

Computer networks are made up of network devices, such as switches, routers, bridges and the like. Network devices are managed by one or more network manager devices. Management of a network device includes monitoring the activity of the network device and controlling certain aspects of its operation.

To communicate information used to manage a network device, the network device and network manager communicate using a protocol. Many communication devices use the "Simple Network Management Protocol" or "SNMP" to communicate this information. SNMP is currently described in Sean Harnedy, *Total SNMP*, 2d. ed. (Prentice Hall. PTR 1998). Three versions of SNMP exist, versions 1, 2 and 3. SNMP may also be used to communicate network management information for purposes other than network management. Network management information is any information that can be communicated using SNMP or any similar information.

Information stored by a device using the SNMP protocol is made up of data elements. A data element may be a single piece of data, known as an object, or a table of objects. A table is an array of data, with each object in the table corresponding to a row and column name. Each object or table has a distinct, individual name. These objects make up a Management Information Base (MIB).

To obtain large amounts of data from a network device using the SNMP protocol, a list of MIB object names, referred to as a MIB object, may be provided to the network device to indicate the data desired. The content of the MIB object indicates the data desired. A command is sent to the network device indicating that the network device should return the data indicated by the list of MIB object names. The conventional SNMP "Getbulk" command can be used for such a purpose.

The conventional Getbulk command has several drawbacks, however. First, when the Getbulk command returns a table data element, if data for a row and column is not stored, the SNMP simply omits providing the unstored data. This requires a programmer to anticipate the possibility that any piece of data in the table can be missing from the result of the Getbulk command. The programmer must detect the missing data and adjust accordingly, complicating the programming of the device receiving such result of the Getbulk command. In order to allow the device receiving the result to detect the missing data from the table, the value of every piece of data from the table is returned with the row name and column name of the piece of data. Because the names are sent with the data, the time required to transmit and receive the result increases beyond that required to transmit the data alone, tying up both the network used to transmit the information, the network device providing the data and the network manager device receiving the data.

Additionally, SNMP requires table rows and columns to be returned in numerical order, but the data may not be stored by the network device in that order. To achieve this requirement, the network device may have to search the entire table to find the next row in numerical order. This process takes additional time and can slow down the network device that provides the data. If there are many rows in tables to be provided, this performance degradation on the network device that must search the table data can be significant.

Because SNMP data may contain billing information, it is desirable to retrieve SNMP data often in order to ensure the data is not lost if the network device crashes. The amount of data retrieved can be quite large, causing the performance problems described above. This can result in the owner of the network causing the data to be retrieved less often than is otherwise optimal.

What is needed is a method and apparatus that can provide network management data elements in a more efficient manner than that provided by SNMP while reducing the programming complexity to receive omitted table data elements.

SUMMARY OF INVENTION

A method and apparatus provides network management data in a manner similar to that of the conventional SNMP Getbulk command, with the exceptions noted below. Tables are provided by providing a table name, then a row of column names in the order columns are provided. For each row in the table, a row name is provided with all the data for that row, with omitted data in each row filled with a null character or other special identifier. The rows and data within each row may optionally be provided in the order stored, not necessarily numerically. The method and apparatus can provide only specified columns of a table instead of providing all the columns of the table. Because the column and row names of a table are provided only once and the rows and data within each row may not be rearranged from the order in which it is stored, the method and apparatus is more efficient than conventional SNMP. Because omitted data is filled, programming complexity is reduced.

DETAILED DESCRIPTION OF A PREFERRED EMBODIMENT

Figure 1:
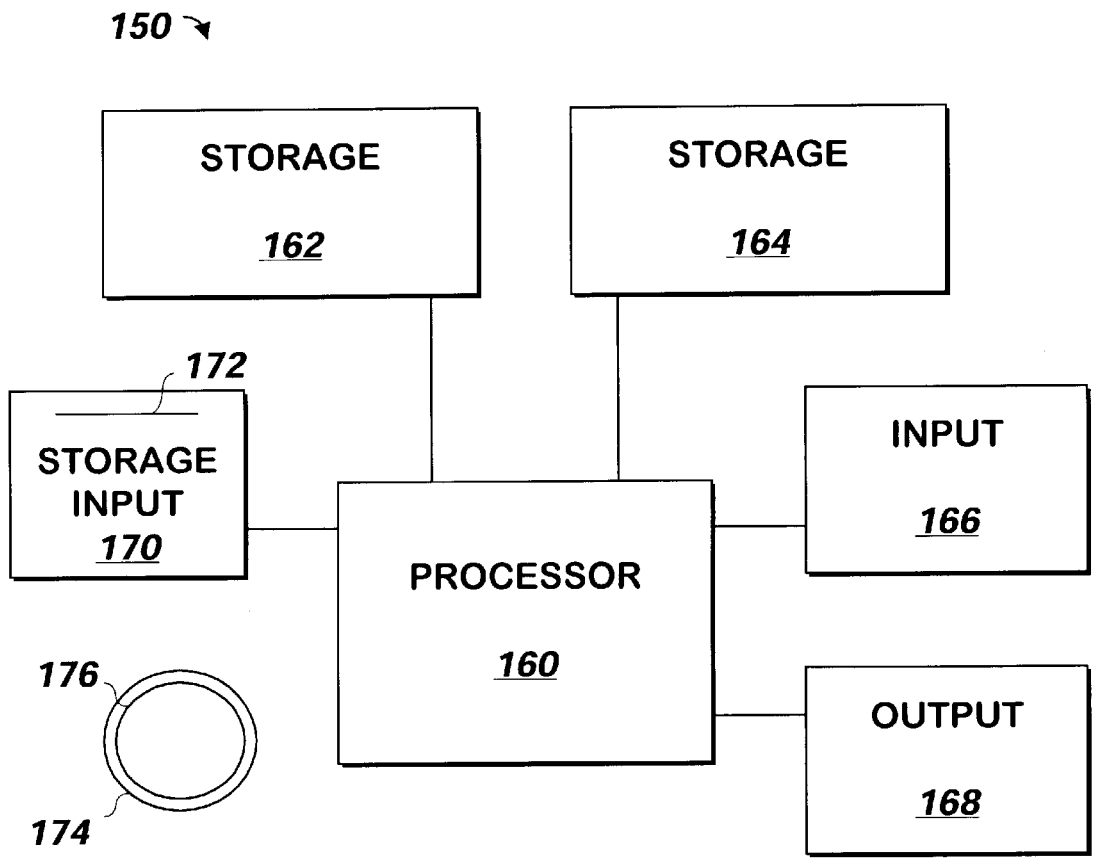
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Mountain View, Calif., with suitable communications hardware and software installed although other systems may be used. One such system is a Cisco AS5800 product running the Cisco IOS operating system.

Figure 2:
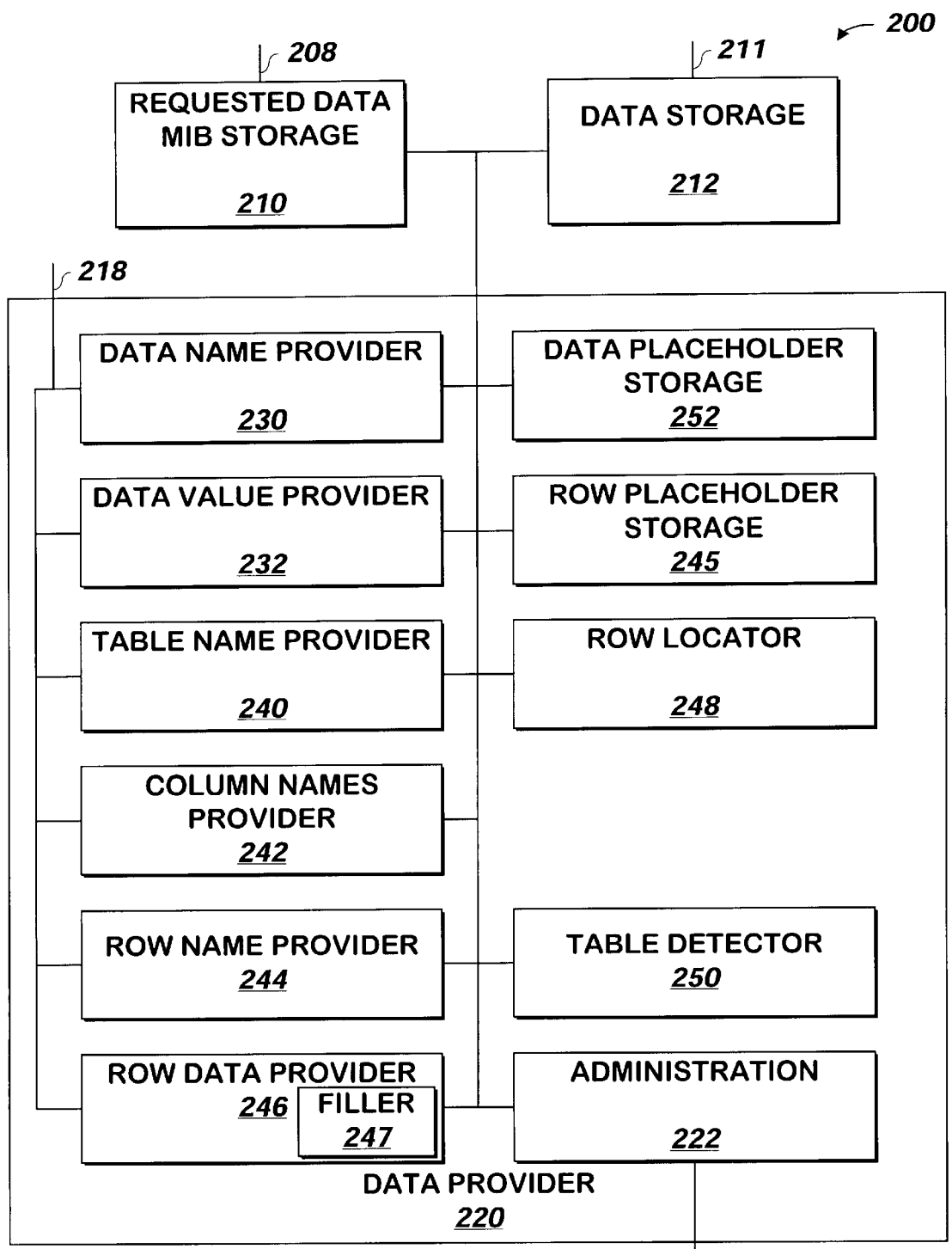
FIG. 2 is a block schematic diagram of an apparatus for providing network management data according to one embodiment of the present invention.

Referring now to FIG. 2, an apparatus for providing SNMP data is shown according to one embodiment of the present invention. Conventional SNMP data is stored in data storage 212, having been input via input 211. This SNMP data may be received as the result of operation of a network device, or may be received as part of an SNMP command. SNMP data is stored as several data elements. In one embodiment, a data element is either a single piece of data, or a set of data arranged as a table with at least one row and at least one column. In one embodiment, data storage 212 stores not only the data elements, but data definitions describing whether or not the element is a table. The data definitions may also include the length in bytes of the data elements.

A description of the requested data is received at requested data storage 210 via input 208. The requested data description received may be a list from a command line, a management information base object, a script or other form of description.

In one embodiment, the requested data description received contains identifiers such as names of the data elements desired, which may be individual data elements or tables, and of the file in which to store the requested data. In one embodiment, the identifiers are those used by other processes and/or apparatii to identify data stored in data storage 212. The description may also contain an indication of the type of file, such as an ephemeral file The description may also contain an indicator of whether the data should be provided to the file in ASCII or binary format. The description may also contain an indicator of whether the data rows and/or the data within each row of any tables requested should be provided in numerical order based on the row names and/or column names of the table, or whether such data should be supplied in a different manner such as the order in which the data is stored, referred to herein as "least CPU intensive" regardless of the impact on any CPU.

In one embodiment, the mere receipt of the requested data description into requested data storage 210 starts the operation of the apparatus 200. In such embodiment, requested data storage 210 signals administration 222 upon receipt of a request at input 208. In another embodiment, the description is stored in requested data storage 210, and a separate command is received at input 224 by administration 222. In such embodiment, input 224 and input 208 may be coupled together.

Administration 222 initiates the value of a place holder stored in data place holder storage 252 by causing the data place holder to indicate the first data element identifier in requested data storage 210. The placeholder stored in requested data placeholder storage 252 is used to keep track of the current data identifier in the list of requested data.

Administration 222 signals table detector 250. Table detector 250 uses the placeholder stored in requested data placeholder storage 252 to determine whether the data in data storage 212 corresponding to the current data identifier in the requested data description stored in requested data storage 210 is a table. In one embodiment, each identifier of the requested data description stored in requested data storage 210 contains an indication of whether the data element requested is a table, and table detector 250 uses this indication to determine whether the identifier corresponds to a table.

In another embodiment, each data element in data storage 212 has a data definition that indicates whether the data element corresponding to the element is a table. Table detector 250 uses the data definitions stored in data storage 212 to identify whether the data element referred to by the data identifier pointed to by the data place holder 252 is a table.

If the data element pointed to is a table, table detector 250 signals table name provider 240 by passing a pointer to the table stored in data storage 212. Table name provider 240 provides at output 218 the name of the table. In one embodiment, table name provider 240 provides this table name from the identifier name in requested data storage 210. In another embodiment, table name provider 240 provides the table name corresponding to the pointer it receives from table detector 250. Table name provider 240 provides the table name at output 218. Table name provider 240 signals column names provider 242 by passing the pointer to the table it received from table detector 250.

In one embodiment, all columns of a requested table are provided by the apparatus 200 of the present invention. In such embodiment, column names provider 242 retrieves from data storage 212 all of the column names of the table pointed to by the pointer received from table name provider 240. In such embodiment, the table names are stored associated with the table as part of the data definitions in the data storage 212. If the "least CPU intensive" indicator is set in the requested data description as described above, column names provider 242 provides at output 218 the column names in the order the columns are stored in the table. Otherwise, column names provider 242 organizes the column names in numerical order, and provides them at output 218. In another embodiment, column names are always provided in numerical order even if the least CPU intensive indicator is set. In such embodiment, the least CPU intensive indicator only affects the order of the rows provided.

In another embodiment, the requested data description can contain the names of columns requested for any table, and only the columns corresponding to column names provided in the requested data description in requested data storage 210 are provided by the apparatus 200 of the present invention. In such embodiment, column names provider 242 uses the requested data placeholder stored in requested data placeholder storage 252 to locate in requested data storage 210 the column names requested. Column names provider 242 provides such column names at output 218, either in the order stored in requested data management information base storage 210 or in numerical order. The column names can be retrieved from the requested data description stored in requested data storage 210 or from the corresponding column names stored in data storage 212 as part of the data definitions for the table corresponding to the pointer received from table name provider 240. Column names provider 242 signals row names provider 244 after providing the column names in any of the ways described above.

Row names provider 244 signals row locator 248. Row locator 248 locates the name and data of the first row corresponding to the table pointed to by the pointer received from table name provider 240, for example using sequential commands that are each similar to the conventional SNMP Getnext command if the order of the data is to be numerical. Row locator 248 receives the column names provided by column names provider 242 and detects the end of a row when the column identifier received corresponds to a column identifier that is supposed to precede the column name of the prior-received column identifier in the order defined by column names provider 242. Row locator 248 passes the row name and data to row name provider 244. In one embodiment, the row name and data is formatted like the output of multiple SNMP Getnext commands used to retrieve a row of an SNMP table. Along with each data element is an indicator of the name of the row and column.

Row names provider 244 provides at output 218 the name of the row using the row name and data received from row locator 248. Row name provider signals row data provider 246 by passing the row name and data or just the row data received from row locator 248 to row data provider 246.

Row data provider 246 receives the data for the row. As row data provider detects a missing piece of data in the row, based on the indicator of the row and column name received with each element of the row data and column names it receives from column names provider 242 as described below, row data provider 246 signals filler 247. Filler 247 inserts a null value in place of the missing column data to for that row.

In one embodiment, row data provider 218 receives from column names provider 242 identifiers of the columns having the names provided by column names provider 242. Row data provider 246 provides at output 218 the data corresponding to, and in the order of, the column names it receives from column names provider 242 using the row data and names received from row name provider 244. The data is provided by row data provider 246 sinenomosequentially as defined below, with the data within each row of a table being provided by row data provider 246 without identifiers of the data in between the data.

Row locator 248, row name provider 244 and row data provider 246 provide the name and data for the next row as described above, and the operation of row locator 248, row name provider 244 and row data provider 246 are repeated if necessary until all rows from the table are provided, detected when the name of the data retrieved by row locator 248 does not correspond to the name of the table.

In one embodiment, row locator 248 locates the next row in numerical order based on the name of the row. In another embodiment, row locator 248 only locates rows in numerical order if the "least CPU intensive" indicator does not indicate this option is desired. Otherwise, row locator 248 locates rows in a different manner, such as locating rows in the order in which the rows are physically or logically stored, locating rows in the order in time in which the rows were stored, or any other order that does not require a search of the table that can be required to obtain a numerically ordered location.

If table detector 250 detects the current data element is not a table, table detector 252 signals data name provider 230. Data name provider 230 retrieves from data storage 212 the data corresponding to the identifier in the requested data storage 210 specified at requested data placeholder storage 252. Data name provider 230 signals data value provider 232. Data value provider 232 retrieves from data storage 212 the value of the data corresponding to the requested data identifier stored in requested data storage 210 at requested data placeholder storage 252. Data value provider provides at output 218 the value of the data retrieved. Data value provider signals administration 222.

If there are additional data element identifiers in the requested data description stored into requested data storage 210, administration 222 advances the placeholder stored in requested data placeholder storage 252, and the apparatus 200 of the present invention repeats the operation described above until all the data corresponding to the requested data description is provided by the apparatus 200 of the present invention.

Figure 3:
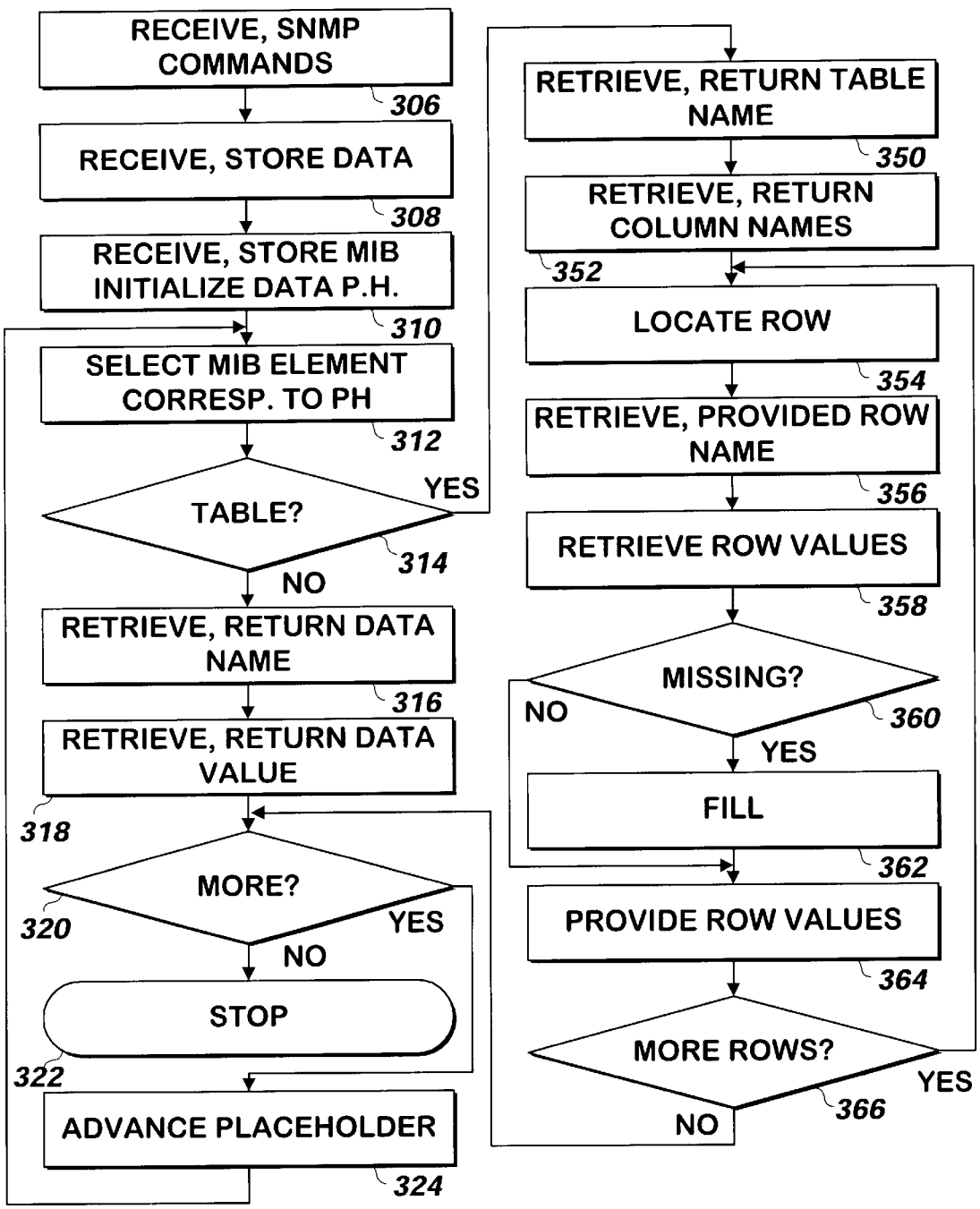
FIG. 3 is a flowchart illustrating a method of providing network management data according to one embodiment of the present invention.

Referring now to FIG. 3, a method of providing network management data is shown according to one embodiment of the present invention.

SNMP commands may be received 306. In one embodiment, the SNMP commands received in step 306 are conventional SNMP commands, and are received independently of steps 312–366. Data may be received and stored 308, for example in response to some or all of the SNMP commands received in step 306 or in response to conventional operation of one or more network devices.

A requested data description is received and stored 310 as described above. A command may also be received 310. In one embodiment, the command received in step 310 requests data corresponding to the requested data description received in step 310. A placeholder is initialized 312 to point to the first data element identifier in the requested data description received in step 310.

The data element identifier in the requested data description corresponding to the placeholder is selected 312. If the selected identifier corresponds to a table 314, the table name is retrieved and returned 316. A determination of whether the selected element is a table may be made using data definitions received with the data as part of step 308 or using the selected identifier as described above. The table name retrieved may be retrieved from the data stored in step 308 or the requested data description stored in step 310.

Column names for the table may be retrieved 352 as described above. The column names for the table may be all the column names in the table or only the column names specified with the data element identifier of the table in the requested data description received in step 310. The column names may be retrieved from the data stored in step 308, or the column names received as part of the requested data description in step 310 if column names are so received. The column names may be provided in numerical order or in the order stored in step 308, depending on whether the requested data description value "least CPU intensive" is not selected or selected, respectively.

A row in the table is located 354. In one embodiment, the row is located in the data stored as part of step 308 or other operation of one or more network devices. In one embodiment, step 354 locates rows in the order physically stored, a logical storage order, a temporal storage order, or any other non-numerical order if a "least CPU intensive" indicator indicating that rows should be provided in an order different from numerical order is received with the requested data description. Step 354 locates rows in numerical order otherwise. In another embodiment, step 354 always locates rows in numerical order, and the "least CPU intensive" indicator only applies to the order of the columns. The row located is the first row in the table the first time step 354 is performed for a particular table, and the second row of the table is located the second time step 354 is performed for that table, and so on. The row name corresponding to the row located in step 354 is retrieved and provided 356 as described above.

Each table is made up of at least two dimensions of elements. Data element values corresponding to the row located in step 354 are retrieved 358 from the data stored in step 308. If some of the values of the row are missing 360, the values are filled, for example with a null value 362 as described above. A value need not be absent to be missing, it could have a value that is the same as an initialized value for the element to be considered missing, or it could have a specified value such as null to indicate that it is not to be provided in response to a conventional SNMP command, request or message.

The values retrieved and optionally filled are provided in step 364. The values are provided in the same order as the corresponding column names were provided in step 352 as described above. The values after the first column of each row are provided "sinenomosequentially." As used herein, "sinenomosequentially" means after a prior value and without the name or other identifier of any element of the row placed between the value and the prior value. For example, assume a row R1 with two columns, named C1 and C2, having values V1 and V2. V2 is provided sinenomosequentially if the following is provided "R1 V1 V2" (the name of the column does not appear between V1 and V2) or "R1 V1 3 V2" (although "3" appears between V1 and V2, it is not the name of any column or element). V2 is not provided sinenomosequentially in the following strings: "V1 C1 V2" and "V1 C2 V2".

In one embodiment, the requested data description received in step 310 contains an indication of which columns are to be provided. In such embodiment, only those values within each row corresponding to the columns indicated are provided as part of step 364. If additional rows exist in the table 366 the method continues at step 354. Otherwise 366, the method continues at step 320 described in more detailed below.

If the selected element in step 312 is not a table 314, the data name and value corresponding to the data element of the data stored in step 308 corresponding to the requested data description element corresponding to the placeholder are retrieved and provided 316, 318. If more requested data description identifiers exist 320 in the requested data description received in step 310, the placeholder is advanced 324 to point to the next requested data description element and the method continues at step 312. Otherwise, the method terminates 322, or in an alternate embodiment, the method continues at step 306.

What is claimed is:

1. A method of providing at least portion of a table of network management data, the table comprising a plurality of rows, each row comprising a plurality of elements, each element having a value, the method comprising:

providing a first value of a first element of a first row of the table of network management data; and providing, sinenomosequentially; a second value of a second element of the first row of the table of network management data.

2. The method of claim 1 additionally comprising providing at least two column identifiers of the columns corresponding to the first and second elements of the table of network management data.

3. The method of claim 1 additionally comprising providing an identifier of the table.

4. The method of claim 1 additionally comprising, after the providing the second element step, providing at least one third data element from a row of the table of network management data stored following the first row of the table and having an identifier in a numerical order before the identifier of the first row of the table of network management data.

5. The method of claim 4 comprising the additional step of providing the name of the table a number of times fewer than the number of elements provided.

6. The method of claim 1 comprising the additional steps of:

identifying a missing data element in the table, assigning a value to the missing element identified; and providing the value assigned in a manner similar to a manner a value for the missing data element would have been provided had the missing data element not been missing.

7. The method of claim 1:

additionally comprising receiving a requested data description comprising content; and wherein the providing steps are responsive to the content of the requested data description received.

8. The method of claim 7 wherein the requested data description comprises column identifiers and the providing steps are responsive to the column identifiers received.

9. An apparatus for providing at least portion of a table of network management data, the table comprising a plurality of rows, each row comprising a plurality of elements, each element having a value, the apparatus comprising:

a data storage for storing the table and for providing at an output at least a portion of the table; and a row data provider having a first input coupled to the data storage output for receiving at least a portion of at least one row of the table, the row data provider for providing at an output a first value of the portion of the at least one row received at the row data provider first input and for providing sinenomosequentially with the first value, a second value of the portion of the at least one row at the row data provider first input.

10. The apparatus of claim 9 wherein:
the row data provider receives at the first row data provider input at least a portion of two rows of the table, each of the two rows having identifiers having an order, the identifier of the second row preceding the identifier of the first row; and
the row data provider additionally provides at the row data provider output at least one value from at least one element of the second row after the row data provider provides the two elements from the first row.

11. The apparatus of claim 10 additionally comprising a data storage, for storing and providing at an output coupled to the row data provider input the table.

12. The apparatus of claim 9 wherein the row data provider additionally comprises a filler having an input coupled to receive an indication indicating one selected from an element had no value and an element had an invalid value, the filler for providing at an output coupled to the row data provider output a value of a third element responsive to the filler input, and the row data provider is additionally for providing said indication responsive to the row data provider input.

13. A computer program product comprising a computer useable medium having computer readable program code embodied therein for providing at least portion of a table of network management data, the table comprising a plurality of rows, each row comprising a plurality of elements, each element having a value, the computer program product comprising:
computer readable program code devices configured to cause a computer to provide a first value of a first element of a first row of the table of network management data; and
computer readable program code devices configured to cause a computer to provide, sinenomosequentially, a second value of a second element of the first row of the table of network management data.

14. The computer program product of claim 13 additionally comprising computer readable program code devices configured to cause a computer to provide at least two column identifiers of the columns corresponding to the first and second elements of the table of network management data.

15. The computer program product of claim 13 additionally comprising computer readable program code devices configured to cause a computer to provide an identifier of the table.

16. The computer program product of claim 13 additionally comprising computer readable program code devices configured to cause a computer to, after the operation of the computer readable program code devices configured to cause a computer to provide the second element, provide at least one third data element from a row of the table of network management data stored following the first row of the table and having an identifier in an numerical order before the identifier of the first row of the table of network management data.

17. The computer program product of claim 16 additionally comprising computer readable program code devices configured to cause a computer to provide the name of the table a number of times fewer than the number of elements provided.

18. The computer program product of claim 13 additionally comprising:
computer readable program code devices configured to cause a computer to identify a missing data element in the table;
computer readable program code devices configured to cause a computer to assign a value to the missing element identified; and
computer readable program code devices configured to cause a computer to provide the value assigned in a manner similar to a manner a value for the missing data element would have been provided had the missing data element not been missing.

19. The computer program product of claim 13:
additionally comprising computer readable program code devices configured to cause a computer to receive a requested data description comprising content; and
wherein the computer readable program code devices configured to cause a computer to provide are responsive to the content of the requested data description received.

20. The computer program product of claim 19 wherein the requested data description comprises column identifiers and the computer readable program code devices configured to cause a computer to provide are responsive to the column identifiers received.

21. A system for providing at least portion of a table of network management data, the table comprising a plurality of rows, each row comprising a plurality of elements, each element having a value, the system comprising:
data storage means for storing the table and for providing at an output at least a portion of the table; and
row data providing means, having a first input coupled to the data storage means output for receiving at least a portion of at least one row of the table, said means for providing row data for providing at an output a first value of the portion of the at least one row received at the row data provider first input and for providing sinenomosequentially with the first value, a second value of the portion of the at least one row at the row data provider first input.

* * * * *